March 27, 1973   KATSUKIYO MARUKAWA   3,723,099
METHOD FOR STATIC CONTROL OF AN OXYGEN BLOWN CONVERTER
Filed Dec. 29, 1970
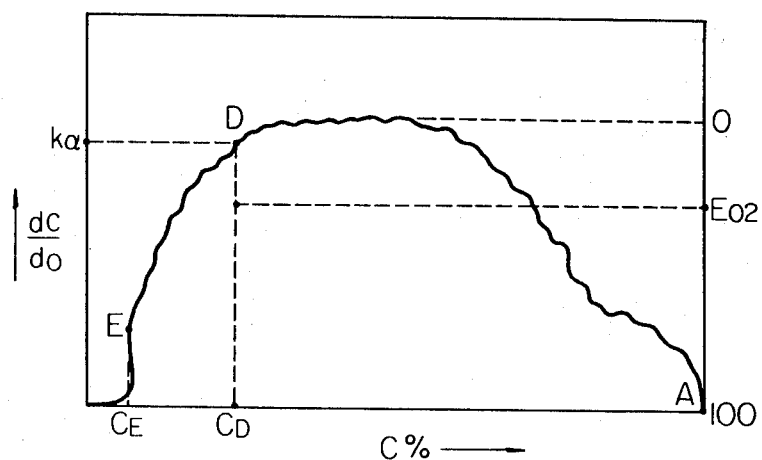
INVENTOR.
Katsukiyo Marukawa
BY: Kelman and Berman
AGENTS “United States Patent Office” 3,723,099
Patented Mar. 27, 1973

3,723,099
METHOD FOR STATIC CONTROL OF AN OXYGEN BLOWN CONVERTER
Katsukiyo Marukawa, Wakayama, Japan, assignor to Sumitomo Metal Industries, Ltd., Osaka, Japan
Filed Dec. 29, 1970, Ser. No. 102,445
Claims priority, application Japan, Jan. 28, 1970, 45/6,982
Int. Cl. C21c 7/00
U.S. Cl. 75—60                                   2 Claims

ABSTRACT OF THE DISCLOSURE

The method for controlling an oxygen blown converter comprising the steps of accumulating decarburizing characteristic values of the past charges obtained by analyzing waste gases exhausted from the mouth of the converter, sorting out charges of the past having refining conditions similar to those of the present control charge to make them the reference charges, calculating the total required amount of oxygen blown assuming that the decarburizing conditions of the reference charges will reappear in the present control charges, and blowing oxygen with such values as the predetermined values.

---

The present invention relates to a method for determining the carbon content of the steel bath at the end point of refining process in an oxygen blown converter by a unique static control system.

The static control system in the present invention means a system to predetermine all the refining conditions prior to the commencement of the refining including the total required quantity of oxygen to be blown into the converter through a lance and to accomplish the refining to the end in accordance with such conditions without amending such predetermined conditions.

In the conventional static control methods, emphasis is laid on calculating values of the amount of oxygen used per unit weight of pig iron with respect to each oxygen blown charge in the past and calculating the amount of oxygen required for obtaining the desired carbon content at the end point of the present oxygen blown charge with the aforementioned values as the reference. However, in such methods, accuracy of the control becomes inevitably rather low since the average decarburizing efficiency of the total refining period is made the standard of the control. Moreover, according as the refining of steel proceeds and the carbon content of the steel becomes lower on decarburization, the decarburizing efficiency decreases in proportion to the carbon content of the steel. Therefore, the calculated values of the amount of oxygen described above cannot be used as reference unless when the carbon content of the steel at the end point of the past charges is exactly similar to the desired carbon content of the present control charge.

There has been proposed a method for controlling the carbon content of the molten steel at every moment or at the end point of the refining process comprising the steps of dividing the entire refining process of the molten steel into three blowing periods, namely the first blowing period in which the decarburizing rate is mainly influenced by the temperature of the hot metal and the silicon content of the materials charged into the converter, the second blowing period in which the decarburizing rate is mainly influenced by the quantity of oxygen supplied independent of the carbon content, and the third blowing period in which the decarburizing rate is mainly influenced by the carbon content, predetermined formulae relative to the decarburizing rate and the carbon content in each of the blowing periods, correcting these formulae by secondary factors as occasion demands, and adding measured values of the carbon contents of the hot metal and the molten steel. However, since the predetermined formulae relating to each blowing period are fixed, this method has a disadvantage that, even in an attempt to utilize the reference charges which are in similar conditions to the charge being presently controlled, it is difficut to make the best use of the result or experience in the past.

Contrary to the method in the previous invention, the control system of the present invention is constructed being based essentially on the feedback system. Namely, first of all, CO and $CO_2$ in the waste gas exhausted from the mouth of the converter of the presently blown charge are analyzed in the known methods (e.g., Japanese patent publication No. 15,516/64, French Pats. Nos. 1,309,212 and 1,325,024 and the Additional Pat. No. 81,514 thereto), and then the charge characteristics to be fed back (to be hereinafter described) are computed using the values of the analysis, and the characteristics are stored in the computer. If the fundamental refining conditions are the same, the values characteristic of each are given and the deviations from the immediate experience, theoretical values or average values are naturally made best of in the control. Though the system of the present invention is quite different from that of the previous invention (Japanese patent publication No. 25,816/68), since the total refining process is divided into three different periods and characteristic values are predetermined in each period also in the system of the present invention, the values characteristic of the charge are obtained easier and the control accuracy is higher than in the system of the previous invention described above.

Recently, not a few computer-aided dynamic control methods—namely, methods for continuously performing the control actions toward the desired values by continuously measuring the conditions in the refining process and continuously correcting the predetermined conditions— have been developed. However, even if the dynamic control methods are applied thoughtlessly, the desired control effect cannot be obtained unless when the control accuracy is raised to such a level that rough control may be performed by static control method and then adequate dynamic control is performed. Namely, in a rapid refining, wherein the steel is expected to be refined in 20 minutes or shorter, the margin and the range for measurement, amendment, correction, and amendment control by dynamic control become very narrow, and if the accuracy of the static control is not high enough, the effect of the dynamic control method cannot be made the most of 100%.

The prior arts, e.g., "Converter Control System and Methods" (Japanese patent publication No. 23,695/67, U.S. Pat. No. 3,377,158) and, "Method of Monitoring and Controlling the Oxygen Blowing Process" (Japanese patent publication No. 4,088/68), have for their objects to control dynamically the relation between the decarburizing rate or decarburizing oxygen efficiency and the carbon content by analyzing the waste gases from the mouth of the converter, and it is essentially impossible even in these dynamic methods to control in high carbon period. Accordingly, in such a case it is necessary to control the steel at the end point of refining by the static control method only. As is evident from the foregoing description, it is very important for control of carbon content at the end point of oxygen blown refining to improve the accuracy of the static control. From this point of view, it is the object of this invention to answer the present demand for increased productivity and improved quality highly utilizing the special quality of a process computer and being based on large experience accumulated from the decarburizing reactions of oxygen blown refining of steel in converter vessels in the past.

The main idea of the static control according to the present invention consists in an attempt to carry out oxygen-blown refining of steel successfully with only static control comprising: storing the decarburizing conditions of the oxygen-blown charges in the past mainly by analyzing the waste gases exhausted from the mouth of the converter, selecting the charges having the refining conditions similar to those of the present charge to be controlled from the stored data and using them as the reference charges for the present charge, and computing the amount of oxygen to be blown into the converter of the present charge assuming that the decarburizing conditions of the reference charges will reappear in the present control charge.

Harry W. Meyer et al., in U.S. Pat. No. 3,377,158 (Japanese patent publication No. 23,695/67), proposed to express the decarburizing condition in the dynamic control of oxygen-blown converter in terms of the characteristic values $\alpha$, $\beta$ and $\gamma$. Namely, the correlation between the carbon content of the molten steel versus the carbon oxidation rate, $dc/do$, is expressed by:

$$\frac{de}{do} = \alpha + \beta e^{\gamma c}$$

where:

$dc/do$ is the carbon oxidation rate at percent C. per 1 ft.$^3$ (0.028 m.$^3$) oxygen,
$\alpha$, $\beta$ and $\gamma$ are parameters, and
C is the C% of the steel bath.

The above-mentioned prior art provides a dynamic control method wherein the characteristic values $\alpha$, $\beta$ and $\gamma$ are continuously measured during the refining process and controlled so as to be converged to the desired decarburization curve. However, in the static control method according to the present invention, the three characteristic values are computed in a batch by the computer at the end of the charges and the values together with the details of the oxygen-blowing conditions are stored in the computer as reference charges for furture charges.

FIG. 1 is a diagram showing the relation between the decarburizing rate per unit amount of oxygen blown and the carbon content.

In FIG. 1, the oxygen-blown refining begins at point A and ends at point E. Point D is the point whereat $dc/do$ drops to $k\alpha$ (where: $k$ is a constant predetermined within the range $0 < k < 1$). $C_D$ is a carbon content of the molten metal at the point D. $E_{O2}$ is an average oxygen loss ratio from the point A through the point D.

After the oxygen-blown refining is finished, the decarburizing curve from the point D through the point E in FIG. 1 is converged to the curve expressed by the equation $$\frac{dc}{do} = \alpha + \beta e^{\gamma c}$$

using the least square method, the characteristic values $\alpha$, $\beta$ and $\gamma$ of the charge are computed, and these values are made the first characteristic values. The decarburization curve is calculated from the analyzed values of the waste gases analyzed by known method, and after the oxygen-blowing the curve is corresponded with the carbon content of the molten steel. Namely, the carbon content of the molten steel may be calculated conversely from the end point of the refining by integrating the analyzed value of the molten steel at the end point and the amount of carbon escaped outside of the control system.

The second characteristic value is the carbon content. $C_D$ of the molten steel at the point D in FIG. 1. whereat $dc/do$ is equal to $k\alpha$. The $C_D$ value is calculated from the carbon content according to the analysis of the molten steel at the end point and the amount of the carbon escaped outside of the control system which amount is known by the analysis of the waste gases.

The theoretically required amount of oxygen from the beginning of the oxygen-blown refining through the point D, ($O_2^{\overline{AD}}$ cal) is calculated as follows:

$$\begin{aligned}O_2^{\overline{AD}}\text{ cal} = &\{8 \cdot Si_{HM} + 9.5(C_{HM} - C_D) \\
&+ 2.1(Mn_{HM} - Mn_D) + 4.7\,Ti_{HM}\} \cdot W_{HM} \\
&+ \{8 \cdot Si_{CM} + 9.5(C_{CM} - C_D) \\
&+ 2.1(Mn_{CM} - Mn_D) + 4.7Ti_{CM}\} \cdot W_{CM} \\
&+ 8\}Si_{SC} + 9.5(C_{SC} - C_D) \\
&+ 2.1(Mn_{SC} - Mn_D) + Cr\} \cdot W_{SC}\end{aligned} \quad (1)$$

where:

$Si_{HM}$ is Si% of hot metal,
$C_{HM}$ is C% of hot metal,
$Mn_{HM}$ is Mn% of hot metal,
$Ti_{HM}$ is Ti% of hot metal,
$W_{HM}$ is weight (ton) of hot metal,
$Si_{CM}$ is Si% of cold metal,
$C_{CM}$ is C% of cold metal,
$Mn_{CM}$ is Mn% of cold metal,
$Ti_{CM}$ is Ti% of cold metal,
$W_{CM}$ is weight (ton) of cold metal,
$Si_{SC}$ is Si% of scraps,
$C_{SC}$ is C% of scraps,
$Mn_{SC}$ is Mn% of scraps,
$W_{SB}$ is weight (ton) of scraps,
$C_D$ is C% at the point D (obtained by calculation),
$Mn_D$ is Mn% at the point D (constant, e.g., 0.30%),
Cr: the term of Cr of scraps may be substituted here.

Then, the amount of oxygen actually blown into the converter vessel from the beginning point A through the point D, ($Q_2^{\overline{AD}}ob$) is calculated by the following formula:

$$O_2^{\overline{AD}}ob = O_2^{\overline{AE}}ob - O_2^{\overline{DE}}ob + 200 Wore$$

$$O_2^{\overline{AD}}ob = O_2^{\overline{AE}}ob - O_2^{\overline{DE}}ob + 200 Wore + 150 Ws + 50 Wl \quad (2)$$

where:

$O_2^{\overline{AD}}ob$ is total amount of oxygen gas actually blown in (m.$^3$),
$O_2^{\overline{DE}}ob$ is amount of oxygen gas blown in from the point D through the point E (the end point),
$Wore$ is weight of iron ore (ton),
$Ws$ is weight of scale (tone),
$Wl$ is weight of lime stone (ton).

provided:

iron ore, scale and lime stone should be charged into the converter vessel before the point D.

The oxygen loss ratio $F_{O2}$ from the oxygen-blowing beginning point A through the point D is calculated in the following formula using the values ($O_2^{\overline{AD}}cal$) and ($O_2^{\overline{AD}}ob$) above:

Oxygen loss ratio $E_{O2}$ $$= \frac{\begin{pmatrix}\text{Amount of oxygen}\\\text{actually used}\end{pmatrix} - \begin{pmatrix}\text{theoretical amount}\\\text{of oxygen required}\end{pmatrix}}{(\text{amount of oxygen actually used})}$$

Accordingly, the oxygen loss ratio $E_{O2}^{\overline{AD}}$ from the oxygen-blowing beginning point A through the point D may be easily calculated by the following Formula 3:

$$E_{O2}^{\overline{AD}} = \frac{O_2^{\overline{AD}}ob - O_2^{\overline{AD}}\text{ cal}}{O_2^{\overline{AD}}ob} \quad (3)$$

The oxygen loss ratio $E_{O2}^{\overline{AD}}$ from the point A through the point D calculated by the above Formula 3 is made the third characteristic value and stored in the memory of the computer together with the first and second characteristic values as reference charges. Upon starting new charge, one charge or a plurality of charges having the conditions similar to the present charge are sorted out as reference charges from the past charges stored in the computer, and the values of the refining conditions of the present charge are calculated from the three characteristic values obtained from the reference charges and given as predetermined values. An example of this process is shown in Table I, wherein the converter vessel capacity is 170 tons, 130 tons of hot metal and 40 tons of scrap are charged, composition of the hot metal ore: $C_{HM}$ 4.5%, $Si_{HM}$ 0.60%, $Mn_{HM}$ 0.70%, and the desired final carbon content is 0.10%.

TABLE I

| Charge No. | First characteristic Values | | | Second C. V. | Third C. V. |
| --- | --- | --- | --- | --- | --- |
| | $\alpha$ | $\beta$ | $\gamma$ | $C_D$ (Percent) | $E_{O_2}^{\overline{AD}}$ (Percent) |
| 1 | 0.001211 | −0.001174 | −4.224 | 0.53 | 21.8 |
| 2 | 0.001288 | −0.001441 | −4.455 | 0.54 | 21.0 |
| 3 | 0.001267 | −0.000941 | −2.978 | 0.67 | 19.0 |
| 4 | 0.001413 | −0.001070 | −2.446 | 0.82 | 17.9 |
| 5 | 0.001201 | −0.001485 | −4.714 | 0.53 | 19.6 |
| 6 | 0.001195 | −0.001235 | −4.478 | 0.52 | 18.8 |
| 7 | 0.001182 | −0.001349 | −4.924 | 0.49 | 20.0 |
| 8 | 0.001229 | −0.000785 | −3.418 | 0.54 | 19.3 |
| 9 | 0.001298 | −0.001327 | −3.590 | 0.64 | 15.9 |
| 10 | 0.001447 | −0.001022 | −2.054 | 0.95 | 23.8 |
| 11 | 0.001236 | −0.001200 | −3.962 | 0.57 | 18.2 |
| 12 | 0.001223 | −0.000788 | −2.931 | 0.63 | 19.8 |

Method of calculation based on the three characteristic values described above is as follows. The values $\alpha$, $\beta$, $\gamma$, $C_D$ and $E_{O_2}^{\overline{AD}}$ are given by the reference charges. Then, the amount of oxygen required from the point A through the point D is calculated in the following formula:

$$O_2^{\overline{AD}} = \{8 \cdot Si_{HM} + 9.5(C_{HM} - C_D) + 2.1(Mn_{HM} - Mn_D)$$
$$+ 4.7 Ti_{HM}\} \cdot W_{HM} \cdot (1 - E_{O_2}^{\overline{AD}}) + \{8 \cdot Si_{CH}$$
$$+ 9.5(C_{CM} - C_D) + 2.1(Mn_{CM} - Mn_D)$$
$$+ 4.7 Ti_{CM}\} \cdot W_{CM} \cdot (1 - E_{O_2}^{\overline{AD}}) + \{8 \cdot Si_{SC}$$
$$+ 9.5(C_{SC} - C_D) + 2.1(Mn_{SC} - Mn_D)$$
$$+ 4.7 Ti_{SC}\} \cdot W_{SC} \cdot (1 - E_{O_2}^{\overline{AD}}) \quad (4)$$

Then, the amount of oxygen required from the point D through the point E where the steel bath has the desired final carbon content, $C_E\%$, is calculated in the following formula:

$$O_2^{\overline{DE}} = \frac{1}{\alpha \cdot \gamma} \{\ln(\alpha e^{\gamma \cdot C_D} - \beta) - \ln(\alpha e^{\gamma \cdot C_E} - \beta)\} \cdot (1 - k_2) \cdot Win \quad (5)$$

where:

$C_E$ is the desired final C% of steel bath,
$k_2$ is a constant showing the loss ratio of the main materials through the point D,
$Win$ is the total weight of all the main materials charged into the converter vessel (ton).

The total amount of oxygen required is calculated from the Formulae 4 and 5 in the following formula:

$$O_2^{\overline{AE}} = O_2^{\overline{AD}} + \overline{DE} \quad (6)$$

From the Formula 6 the amount of oxygen blown into the converter vessel is calculated in the following formula:

$$O_2^{\overline{AE}}(gas) = O_2^{\overline{AE}} - (200 W ore + 150 Ws + 50 Wl) \quad (7)$$

where:

dimension of gas is m.³, and
dimension of W is ton.

Namely, oxygen-blown refining is carried out with the predetermined amount of oxygen calculated in the above Formula 7 and the point whereat the predetermined amount of oxygen is blown out is the point E where the steel having the desired final carbon content of $C_E\%$ is obtained. During this refining process, any analysis of the molten steel ingredients or measurement of the molten steel temperature is not performed and, of course, any control action is not taken as well.

An example of reference charge selection is explained immediately below. First of all, a reference charges selection table is decided as shown in Table II and stored in the computer. Namely, at least 50 recent charges stored in the computer are collated against the 11 selection items as shown in Table II in sequence from the first to fourth selections, and at least 5 charges having the refining conditions the most similar to the charge to be presently controlled are sorted out. The precedence among these selected charges is decided by the similarity of their actual carbon content of $C_E\%$ at the end point to the desired final carbon content C% of the charge to be presently controlled. Thus, the charge of the first precedence having the actual carbon content $C_E\%$ the most similar to the desired carbon content C percent is decided, and from this charge the values $\alpha$, $\beta$, $\gamma$, $C_D$ and $E_{O_2}^{\overline{AD}}$ are taken out and used in calculation of the amount of total oxygen flow to be blown into the converter by the Formulae 4–7.

TABLE II

| Item | Selection | | | |
| --- | --- | --- | --- | --- |
| | 1st | 2d | 3d | 4th |
| Total main materials supplied (ton) | (a) | (a) | ±20 | ±5 |
| Hot metal (percent) | (a) | ±3 | ±2 | ±1 |
| Cold metal (percent) | (a) | ±3 | ±2 | ±1 |
| Scrap (percent) | (a) | ±3 | ±2 | ±1 |
| Calcium oxide + ½ Fluorite (ton) | (a) | ±3 | ±2 | ±1 |
| Volume of oxygen blown-in (m³) | ±4,000 | ±3,000 | ±2,000 | ±1,000 |
| Lance height (mm.) | ±300 | ±200 | ±100 | ±50 |
| Fluorite (kg.) | ±250 | ±200 | ±200 | ±100 |
| Silica (kg.) | ±300 | ±200 | ±150 | ±100 |
| End point temperature (° C.) | ±60 | ±40 | ±40 | ±20 |
| Number of charges | ±50 | ±50 | ±50 | ±50 | a Unlimited.

I claim:

1. A method of controlling the ultimate carbon content of the molten steel refined from a new charge in an oxygen blown converter which comprises:
   (a) selecting data on decarburization conditions of at least one reference charge among the decarburization data of approximately fifty previous charges refined in said converter,
      (1) said at least one reefrence charge being closest to said new charge in total weight, percentages of hot metal, cold metal, and scrap, the combined weight of CaO and fluorite, the respective weights of fluorite and silica, and the temperature at the end point of said refining;
   (b) calculating, prior to said refining of said new charge, the total amount of oxygen required for refining said new charge under the assumption that the decarburization conditions of said new charge will be the same as the conditions represented by said data of said at least one reference charge;
   (c) refining said new charge by blowing with said calculated amount of oxygen; and
   (d) terminating said refining after said calculated amount of oxygen has been blown.

2. A method as set forth in claim 1, wherein the data on decarburization conditions of said previous charges are collected by converting the decarburizing rate curve of each of said previous charges, while the decarburizing rate tends to drop, to a curve expressed by the formula:

$$\frac{dc}{do} = \alpha + \beta e^{\gamma C}$$

by the least square method for calculating the constants $\alpha$, $\beta$, and $\gamma$ as the first characteristic values; calculating the oxygen loss ratio as another characteristic value from the beginning of the oxygen blowing to a period at which $$\frac{dc}{do} = k\alpha, \quad 0 < k < 1$$

and the carbon content C of said charge at said period as yet another characteristic value, said characteristic values constituting said data, in said equations, $dc/do$ being the oxidation rate of carbon in weight percent of said previous charge, C being the instantaneous carbon content of said charge, and $\alpha$, $\beta$, $\gamma$, and $k$ being constants.

References Cited

UNITED STATES PATENTS

| | | | |
|---|---|---|---|
| 3,377,158 | 4/1968 | Meyer et al. | 75—60 |
| 3,575,696 | 4/1971 | Rehmus et al. | 75—60 |
| 3,181,343 | 5/1965 | Fillon | 73—23 |
| 2,807,537 | 9/1957 | Murphy | 75—60 |
| 3,329,495 | 7/1967 | Ohta et al. | 75—60 |

FOREIGN PATENTS

| | | | |
|---|---|---|---|
| 1,156,392 | 6/1969 | Great Britain | 75—60 |
| 1,185,086 | 3/1970 | Great Britain | 75—60 |
| 1,156,722 | 7/1969 | Great Britain | 75—60 |

L. DEWAYNE RUTLEDGE, Primary Examiner

J. E. LEGRU, Assistant Examiner